Figure 1:
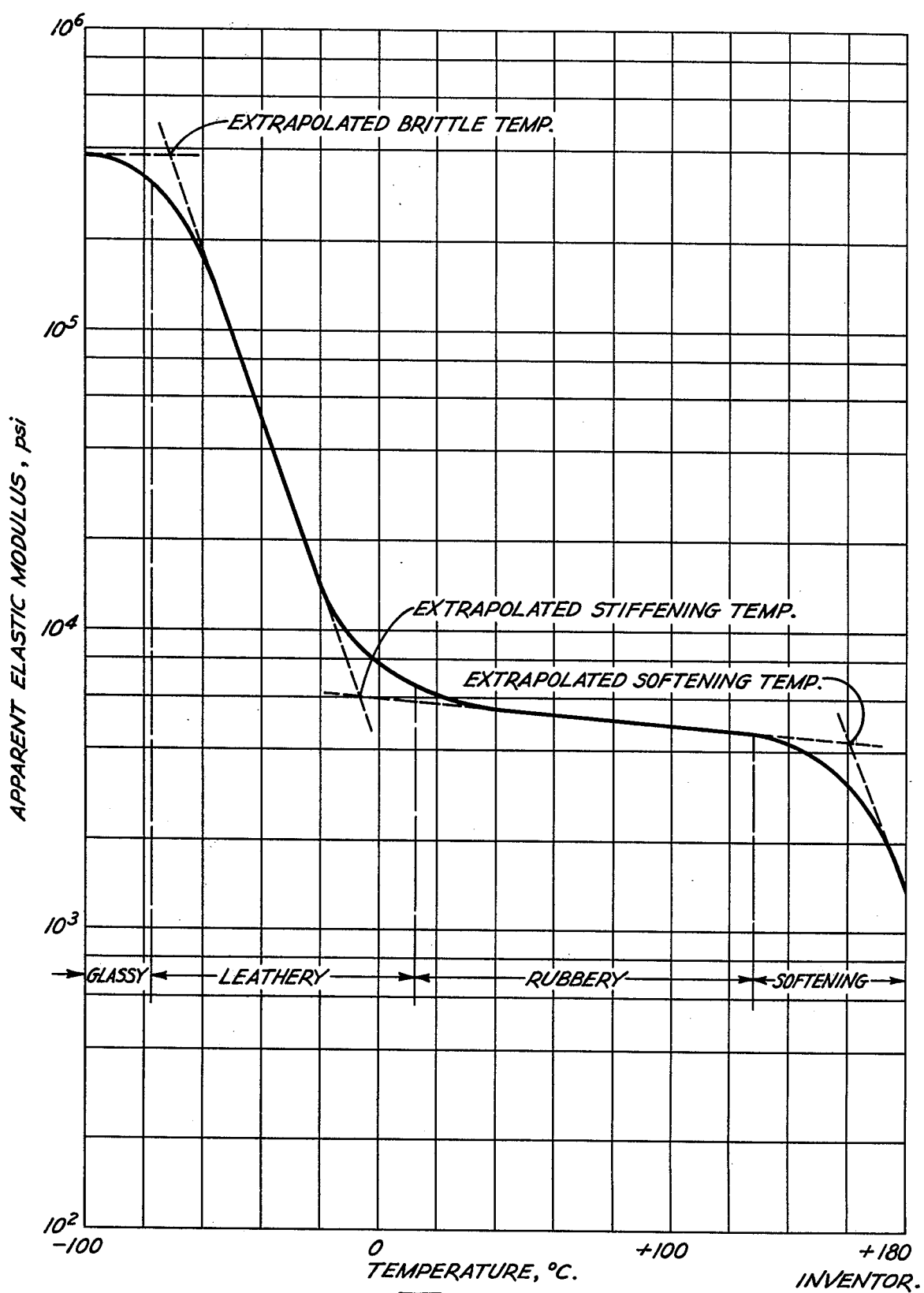

United States Patent [19]

Heiss

[11] 4,129,611

[45] Dec. 12, 1978

[54] THERMOPLASTIC POLYURETHANES OF MIXTURES OF HARD AND SOFT THERMOPLAST POLYMERS

[75] Inventor: Herbert L. Heiss, New Martinsville, W. Va.

[73] Assignee: Mobay Chemical Corporation, Pittsburgh, Pa.

[21] Appl. No.: 531,026

[22] Filed: Dec. 9, 1974

Related U.S. Application Data

[63] Continuation-in-part of Ser. No. 121,652, Mar. 8, 1971, abandoned.

[51] Int. Cl.$^2$ .................... C08L 75/04; C08L 75/06; C08L 75/08
[52] U.S. Cl. ................................................ 260/858
[58] Field of Search ........................................ 260/858

[56] References Cited

U.S. PATENT DOCUMENTS

| | | | |
|---|---|---|---|
| 3,012,987 | 12/1961 | Ansul | 260/858 |
| 3,240,842 | 3/1966 | Sauders | 260/858 |
| 3,284,539 | 11/1966 | McElroy | 260/858 |
| 3,509,232 | 4/1970 | Schollenberger | 260/858 |
| 3,542,903 | 11/1970 | Congiundi et al. | 260/858 |
| 3,663,513 | 5/1972 | Kazama et al. | 260/858 |
| 3,711,571 | 1/1973 | Farah | 260/858 |

*Primary Examiner*—John C. Bleutge
*Attorney, Agent, or Firm*—Gene Harsh; Joseph C. Gil

[57] ABSTRACT

Thermoplastic poluyrethane polymers having improved physical properties over a wide temperature range are produced from a physical mixture of thermoplastic polymers of (a) from about 10 to about 90 percent of a soft polymer prepared from an organic isocyanate having an average functionality of about 2 and an organic compound or compounds containing active hydrogen atoms and having an average functionality of about 2 and an average equivalent weight greater than 200 at an NCO to active hydrogen ratio of from about 0.9/1 to about 1.1/1, and (b) from about 90 to 10 percent of a hard polymer prepared by reacting at an NCO to active hydrogen ratio of from about 0.9/1 to about 1.2/1 an organic icocyanate having an average functionality of from about 1.90 to about 2.20 with an organic compound or compounds containing active hydrogen atoms and having an average functionality of about 2 and an average equivalent weight less than 100.

13 Claims, 2 Drawing Figures

THERMOPLASTIC POLYURETHANES OF MIXTURES OF HARD AND SOFT THERMOPLAST POLYMERS

This application is a continuation-in-part of U.S. application Ser. No. 121,652, filed Mar. 8, 1971 now abandoned.

This invention relates to thermoplastic polyurethane products generally and more specifically to thermoplastic polyurethane products having an improved property spectrum over a wide temperature range, that is, from extremely low temperatures to extremely high temperatures at which polyurethanes now find application.

In the preparation of polyurethanes generally and polyurethane elastomers specifically, one of the foremost methods of preparation has been to react an organic polyisocyanate with an organic compound containing at least two active hydrogen atoms and having a molecular weight of at least 600 and a chain extending agent, which is generally a compound having a molecular weight less than about 300 and containing at least two active hydrogen atoms, to produce a polymer which upon solidification exhibits specific physical properties that are primarily due to the nature of the three reactive ingredients used and also to the quantities of each of the reactants used. In many of the formulations now being commercially used the quantity of the organic polyisocyanate is such that the number of NCO groups present in the reactive mixture is substantially equivalent to or in slight excess to the number of active hydrogen atoms present in the remaining two ingredients.

A variety of processing techniques have evolved over the course of polyurethane history. Initially one of the prime objects was to develop a system which could be used on machinery commercially found in the rubber industry. Thus, a method which has come to be called the "millable gum" method evolved. In this technique the reactants such as those mentioned above are utilized initially in amounts such that the active hydrogen atoms are present in an excess over the NCO groups of the organic polyisocyanate. A gum is formed which can be processed by the same techniques as raw rubber on the rubber mills. Upon being processed on a rubber mill an additional quantity of organic polyisocyanate is added to the gum and worked in by a continuing process until satisfactory distribution in the gum takes place. This thermoset material is then used to form objects by compression molding techniques.

An additional method of preparation, which is much simpler than the "millable gum" technique is the casting method. By this technique the same type of reactants as set forth above are mixed in quantities such that the organic polyisocyanate is used in either an equivalent or a slight excess to the quantity of active hydrogen atoms present in the other two reactants. The liquid ingredients are intimately combined by a suitable mixing technique and immediately poured in the liquid state into a mold having the desired configuration. The resulting thermoset product generally has a cross-linked structure, the properties of the article being inherently fixed by the various reactants used and the quantities of each.

Subsequent to this development an additional method of processing, which has come to be called the "thermoplastic method", has evolved. This method is somewhat similar to the casting method in the types of reactants and the quantity used with the materials in the liquid state being mixed and immediately cast in a thin layer onto a support surface such as a moving conveyor belt. The material is brought to room temperature shortly after solidification of the reactive materials and then chopped or ground into the desired particle size. This material has a substantially linear chemical structure and is processable by the commonly known thermoplastic processing techniques such as injection molding, transfer molding, extrusion and the like. Upon curing, a thermoset structure results.

A great deal of knowledge has been gained over the years with regard to design of the polyurethane polymer intended to satisfy a desired set of physical property characteristics. For example, the urethane polymer chemist knows that to achieve the ultimate physical properties under a given set of conditions (i.e. the reactants being those commercially available at a reasonable price) he can generally fabricate the polymer in a predetermined fashion to achieve this desired end. Thus, in the preparation of a spandex fiber the polymer chemist knows that he must make a segmented polyurethane polymer which contains both hard blocks and soft blocks in a particular ratio depending upon his ultimate goal. Further, the polymer chemist knows that under a given set of conditions he should link together a plurality of soft blocks and then a plurality of hard blocks. Still another chemist working in the urethane field can achieve his goal by creating a polymer which has a random distribution of both hard and soft blocks because his goal is quite dissimilar to that of the chemist operating in the spandex or fiber field.

Regardless of the type of application one is endeavoring to suit his particular polyurethane polymer to, it is extremely difficult to design a polymer which will possess outstanding physical properties both at high temperatures and at low temperatures. Thus, for a given application which will be used under high temperature conditions, the polymer chemist will recommend one particular type of polyurethane polymer while for an application at extremely low temperatures the polymer chemist will recommend a different type of polyurethane polymer. This can present many problems when, for example, one envisions a part designed to go into the manufacture of an automobile, where some automobiles are sent to tropical areas, others are sent to arctic regions and still others are sent to regions that are extremely cold during one season and extremely hot during another. The part if designed to withstand high temperatures will operate extremely well in the tropics, but the same part in the arctic regions will not give the desired service. The contrary is also true. This disadvantage renders many types of polyurethanes impractical for certain applications because the ultimate destination of a given part cannot be predicted and the properties are not always satisfactory over a wide temperature range.

In addition to these problems, the chemist must choose a polymer that, when fabricated into the desired article of manufacture, will exhibit properties satisfactory to the particular application, whether the application is a motor mount, a pump diaphragm, or the like. That is, the chemist must design the polymer to meet the specifications provided by the ultimate user. One such physical property that must be met is modulus of elasticity, which varies with the temperature. When plotted against temperature, a curve is generated that clearly illustrates the property diagram of a given material over a broad temperature range, that is, from a temperature at which the material is brittle because of the cold, to a temperature at which the material softens and ultimately melts. One such curve is called a Clash-Berg Curve and can be arrived at for any given material by the "Standard Method of Test for Stiffness Properties of Plastics as a Function of Temperature by Means of a Torsion Test, ASTM Designation D 1043-69". A typical Clash-Berg Curve for polyurethanes is shown in FIG. 1. This curve, reading from left to right, shows the temperature range in which the material is glassy or brittle; the brittle temperature, the point where the material passes into a leathery state; the stiffening temperature, which is the transition point from the leathery state to the rubbery state; the rubbery state, which is the state in which the plastic is generally useful and the softening point or range. One goal is to design a material that has the highest modulus at the lowest stiffening temperature.

It is therefore an object of this invention to provide thermoplastic polyurethane polymers that are free of the disadvantages of those heretofore known. It is another object of this invention to provide thermoplastic polyurethane polymers having improved properties over a wide temperature range. It is still another object of this invention to provide an improved method of preparing thermoplastic polyurethane polymers having improved properties over wide temperature ranges. It is a further object of this invention to provide improved thermoplastic polyurethane polymers having a minimum stiffening temperature and a maximum heat distortion temperature. It is a still further object of this invention to provide a method of preparing thermoplastic polyurethanes which is not limited by the viscosity of the polymer. It is a further object of this invention to provide thermoplastic polyurethane materials which exhibit extremely good Clash-Berg Curves. It is still another object of this invention to provide thermoplastic polyurethane polymers having Shore D hardnesses greater than 60. It is still a further object of this invention to provide a thermoplastic polyurethane having a high modulus and a low stiffening temperature.

The foregoing objects and others, which will become apparent from the following description taken in conjunction with the attached graphs in which FIG. I is a typical Clash-Berg Curve as described above and FIG. II is a graph illustrating the advantages of the invention, are accomplished in accordance with this invention, generally speaking, by providing a physical mixture of (A) from about 10 to about 90 percent by weight of a soft thermoplastic polymer prepared by reacting at an NCO to active hydrogen atom ratio of from about 0.9/1 to about 1.1/1 (1) an organic isocyanate having an average functionality of about 2 with (2) an organic compound or compounds containing active hydrogen atoms and having an average functionality of about 2 and an average equivalent weight greater than 200 and (B) from about 90 to about 10 percent by weight of a hard thermoplastic polymer prepared by reacting at an NCO to active hydrogen atom ratio of about 0.9/1 to about 1.2/1 (1) an organic isocyanate having an average functionality of from about 1.90 to about 2.20 with (2) an organic compound or compounds containing active organic hydrogen atoms and having an average functionality of about 2 and an average equivalent weight less than 100. Thus the invention contemplates preparing a soft thermoplastic polyurethane polymer within the criteria set forth above and combining this with a hard thermoplastic polymer having the characteristics set forth, thereby forming a thermoplastic physical mixture. It has been found that by preparing these two types of thermoplastic polymers (i.e. the hard polymer and the soft polymer) individually and combining them into a physical mixture, a superior property spectrum over a wide temperature range and particularly at low temperatures is achieved. This is an extreme deviation from the practice and belief heretofore known in the art, that it was necessary to fabricate a polymer which contained both hard and soft blocks in the same molecule. By "physical mixture of hard and soft polymers" is meant a mixture of separately prepared polymers which may contain an occasional allophanate branch point resulting from the reaction of an —NCO group on the hard or soft polymer with a urethane group on the soft or hard polymer. This can only occur when the hard or soft polymer is made at an NCO to active hydrogen ratio slightly greater than 1, which is the preferred embodiment. By "thermoplastic" is meant that the material can be repeatedly processed, e.g. by molding and/or extruding, upon heating.

It has been observed that through the procedure described of physically combining hard and soft thermoplastic polymers, the best properties contributed by each are retained in the completed article and not sacrificed as in many cases when the two types of blocks are contained in the same molecule. Thus the low temperature properties attributable to the soft polymer along with the high temperature properties attributable to the hard polymer are essentially present in the completed product. The unusually good properties obtained in these mixtures are unexpected, since conventional polymer mixtures are usually inferior to the corresponding block polymers. Most conventional mixtures, however, employ non-polar components (or at least one non-polar component). In this invention both hard and soft polymers have a high degree of polarity, and thus there exists between the two a high degree of attraction (hydrogen bonding) even in cases where a two-phase system results. This, plus the possibility of a few discrete chemical attachments (in the preferred mode of embodiment), is believed to be responsible for the unusual combinations of properties realized. Further, the processing advantages are many due to the various methods of preparation of the completed articles. For example, in designing a specific polymer by the heretofore known techniques, it is difficult if not impossible to employ different isocyanates to achieve a given object having both hard and soft block portions of the molecule. By the method taught herein one can prepare the hard polymer from a first organic polyisocyanate and the soft polymer from a second type of organic polyisocyanate to achieve a particular desired result. Another advantage is that in the preparation of the hard and soft polymers as individual components and not as common members of a given molecular structure, one can prepare polymers of much higher molecular weight thus achieving results with regard to physical properties which have been heretofore known in urethane polymer chemistry.

In the prior art methods of preparation, the molecular weight of a given polymer block is generally dependent upon the reaction conditions and the ratio of the isocyanate to active hydrogen components. In other words, the ratio of the low molecular weight active hydrogen containing compounds to the higher molecular weight active hydrogen compounds, the mobility of the various reactants in the reactive system, the speed at which a given type of active hydrogen atom will react with a given type of NCO group, that is, whether or not the active hydrogen atom is a primary or secondary hydroxyl group or amino group or whether the NCO group is an aliphatically bound NCO or an aromatic NCO group, etc. are variables which affect the molecular weight of the hard and soft segments. Additionally, when both hard and soft blocks are incorporated into the same molecule, the viscosity is dependent on the overall molecular weight of the polymer and not on the molecular weight of the hard or soft segments taken alone, thus restricting the range of polymers useful for any given purpose. It can thus be seen that many variations are present in a given system to prepare a polyurethane polymer containing within the molecular structure both hard and soft blocks and that definite limitations are imposed by the very nature of the method of preparation. In the immediate instance one is not faced with such an overwhelming number of variables or limitations because each of the two necessary components, that is, the hard and soft polymers are prepared individually and regardless of the method of preparation polymers of higher molecular weight can be achieved. While the particular hard and soft polymers generally do not become a part of the same polymer backbone they contribute in the same fashion to the ultimate physical properties as do the blocks incorporated within the molecule. In fact, when mixtures of hard and soft polymers are used in accordance with this invention, articles having a Shore D hardness greater than 60 can be consistently prepared by known thermoplastic molding techniques. This cannot be said of presently known polymers having the hard and soft segments incorporated into the same molecule because an extremely high isocyanate content in the reactive mix would be necessary. This creates such an excessive exotherm that reproducible control over the reaction is almost non-existent resulting in cross-links which create processing difficulties.

FIG. II is a graph of 100% modulus versus stiffening temperature taken from data set forth in Tables I and II which follow hereinafter.

The line drawn through the square points represents an average for polymers containing both hard and soft blocks. The line derived from the points indicated as solid circles represents an average for mixtures of polymers in accordance with this invention. It can be seen that at comparable modulus values the stiffening temperature is on the average about 25° C. lower when mixtures are used versus a given block polymer. By the same token at a given stiffening temperature, the 100% modulus is much higher. Similar relationships exist between hardness and stiffening temperature.

In the preparation of the soft thermoplastic polymers any organic compound having active hydrogen atoms which are reactive with NCO groups and having an equivalent weight greater than 200, preferably from 200 to about 5000 and most preferably from about 500 to about 1000 or mixtures of compounds having active hydrogen atoms reactive with NCO groups having an average functionality of about 2 and having an average equivalent weight of at least 200 may be used, such as, for example, hydroxyl polyesters, polyesters amides, polyalkylene ether glycols, polyhydric polythioethers, polyacetals and the like.

Any suitable substantially linear hydroxyl polyester may be used such as, for example, the reaction product of a dicarboxylic acid and a dihydric alcohol and also polyesters prepared from lactones such as caprolactone and the like. Any suitable dicarboxylic acid may be used in the preparation of polyesters such as, for example, adipic acid, succinic acid, suberic acid, sebacic acid, oxalic acid, methyladipic acid, glutaric acid, pimelic acid, azelaic acid, phthalic acid, isophthalic acid, thiodiglycollic acid, thiodipropionic acid, maleic acid, fumaric acid, citraconic acid, itaconic acid and the like. Any suitable dihydric alcohol may be used in the reaction with the dicarboxylic acid to form a polyester, such as, for example, ethylene glycol, propylene glycol, hexanediol, bis-(hydroxy methyl cyclohexane), 1,4-butanediol, diethylene glycol, polyethylene glycol, 2,2-dimethyl propylene glycol, xylylene glycol, and the like. Any suitable polyester amide may be used by replacing some of the glycol used in the preparation of hydroxyl polyesters with an organic diamine, an amine alcohol or a lactam such as, ethylene diamine, 1,4-butane diamine, 1,6-hexane diamine, 1,4-pentane diamine, 2,4 and 2,6-tolylene diamine, 4,4'-diamino diphenylmethane, xylylene diamine, 1,4-cyclohexane diamine, phenylene diamine, naphthalene diamine, aminoethyl alcohol, aminopropyl alcohol, aminobutyl alcohol, aminooctyl alcohol, hydroxyethyl-aminoethylether, caprolactam, Δ-valerolactam and the like.

Any suitable polyalkylene ether glycol may be used such as, for example, the condensation product of an alkylene oxide with a compound containing two active hydrogen atoms such as, for example, water, ethylene glycol, propylene glycol, butylene glycol, amylene glycol, hydroquinone, pyrocatechol, pyrogallol, N-ethyl aminoethanol, N-methyl diethanolamine and the like. Any suitable alkylene oxide condensate may also be used such as, for example, the condensates of ethylene oxide, propylene oxide, butylene oxide, amylene oxide, styrene oxide and mixtures thereof. The polyalkylene ethers prepared from tetrahydrofuran may be used, such as, polytetramethylene ether glycols. The polyhydric polyalkylene ethers may be prepared by any known process such as, for example, the process described by Wurtz in 1859 and in the "Encyclopedia of Chemical Technology" Volume 7, pages 257 to 262, published by Interscience Publishers in 1951, or in U.S. Pat. No. 1,922,459.

Any suitable dihydric polythioether may be used such as, for example, the reaction product of one of the aforementioned alkylene oxides used in the preparation of the polyhydric polyalkylene ether with a polyhydric thioether such as, for example, thiodiglycol, 3,3'-dihydroxy propyl sulfide, 4,4'-dihydroxy butyl sulfide, 1,4-(3-hydroxyethyl) phenylene dithioether and the like.

Compounds such as these may be used so long as they have an equivalent weight greater than 200. Further, small amounts of trifunctional reactants may be used in the preparation of these active hydrogen compounds so long as it does not interfere with the thermoplastic nature of the soft polymers. In addition monofunctional compounds may also be used to cause chain stoppage, however, when compounds other than difunctional ones are used in the preparation of these compounds, the average functionality of all the active hydrogen compounds used should be about 2. These compounds may also be used in combination with compounds having an equivalent weight less than 200 as long as the average equivalent weight of the combination is greater than 200, such as, for example, polyhydric alcohols including such as, for example, ethylene glycol, propylene glycol, 1,4-butanediol, 1,3-butanediol, 1,5-pentanediol and the isomers thereof, 1,6-hexanediol and the isomers thereof, xylylene glycol, diethylene glycol, thiodiglycol, p-phenylene-di-3-hydroxy-ethyl ether, trimethylol propane, glycerol, tris-(hydroxy-ethoxy) benzene, diethanolamine, triethanol amine, dipropanol amine, tripropanol amine and the like; organic polyamines such as, for example, ethylene diamine, propylene diamine, 1,4-butylene diamine, 1,3-butylene diamine, hexamethylene diamine, methylenebis-(o-chloro aniline), tolylene diamine, 4,4'-diaminodiphenyl methane, xylylene diamine, 2,4,6-tolylene triamine and the like; amino alcohols such as, for example, aminoethyl alcohol, aminopropyl alcohol, aminobutyl alcohol and the like; polycarboxylic acids such as, for example, those mentioned above with relation to the preparation of hydroxyl polyesters, aminoacids such as, for example, aminoacetic acid, aminopropionic acid, aminoisovaleric acid, aminovaleric acid, aminoisocaproic acid, aminocaproic acid, aminobutric acid, amino succinic acid and the like. It is to be understood as stated above that where higher functional components are used in admixture or in the preparation of the substantially linear active hydrogen compounds, the average functionality should be about 2. Thus, where small amounts of higher functional compounds are used, such as, 2,4,6-tolylene triamine, set forth above, a monofunctional reactant should also be employed, such as, ethanol, butanol, hexanol, ethylamine, butylamine, phenylamine and the like.

In the preparation of the hard thermoplastic polymer it is necessary to utilize an active hydrogen component or a combination of components that has an average equivalent weight less than 100, and an average functionality of 2. Thus, it is possible for one to use in the preparation of the hard polymer an active hydrogen containing compound having an equivalent weight greater than 100 as long as it is used in combination with a sufficient quantity of an active hydrogen compound having a lower equivalent weight so the mixture has an average equivalent weight less than 100. It is preferred, however, that only one active hydrogen component be used in the preparation of a specific hard polymer. This compound must have an equivalent weight less than 100. Any of the active hydrogen containing polymers mentioned above with regard to the formation of the soft polymer may be used in mixture with lower equivalent weight compounds or the lower than 100 equivalent weight compounds can be used alone, such as, water, hydrazine, organic glycols, such as, for example, ethylene glycol, propylene glycol, 1,4-butanediol, 2,3-butanediol, 1,5-pentanediol, 1,4-pentanediol, 1,3-pentanediol, 1,6-hexanediol, 1,4-hexanediol, neopentyl glycol, and bis-$\beta$-hydroxyethyl ether of hydroquinone, diethylene glycol, dipropylene glycol, 1,4-cyclohexanediol, polyethylene glycols and polypropylene glycols, having an equivalent weight up to 100 if used alone and higher equivalent weights when used in combination with lower weight glycols or other active hydrogen containing compounds and the like; polyamines such as, for example, ethylene diamine, propylene diamine, butylene diamine, 1,4-diaminohexane, 1,6-diaminohexane, 4,4'-diaminodiphenyl methane, isophorone diamine, 1,5-naphthylene diamine, 1,3 and 1,4-phenylene diamine; aminoalcohols such as, for example, ethanol amine, aminopropyl alcohol, aminobutyl alcohol, aminohexyl alcohol, those previously mentioned herein, and the like.

Any suitable organic diisocyanate may be used in the process of this invention for the preparation of either the hard or soft polymer, such as, for example, aliphatic, aromatic, alicyclic and heterocyclic diisocyanates including such as, for example, ethylene diisocyanate, ethylidene diisocyanate, propylene diisocyanate, butylene diisocyanate, cyclopentylene-1,3-diisocyanate, cyclohexylene-1,4-diisocyanate, cyclohexylene-1,2-diisocyanate, 2,4-tolylene diisocyanate, 2,6-tolylene diisocyanate, 4,4'-diphenyl-methane diisocyanate, 2,2-diphenylpropane-4,4'-diisocyanate, 3,3'-dimethyldiphenylmethane-4,4'-diisocyanate, p-phenylene diisocyanate, m-phenylene diisocyanate, xylylene diisocyanate, 1,4-naphthylene diisocyanate, 1,5-naphthylene diisocyanate, diphenyl-4,4'-diisocyanate, azobenzene-4,4'-diisocyanate, diphenylsulfone-4,4'-diisocyanate, dichlorohexamethylene diisocyanate, tetramethylene diisocyanate, pentamethylene diisocyanate, hexamethylene diisocyanate, 1-chlorobenzene-2,4-diisocyanate, furfurylidene diisocyanate, 2,7-diisocyanatodibenzofuran and the like. Higher functional isocyanates such as, 2,4,6-tolylene triisocyanate, 4,4',4''-triphenylmethane triisocyanate, 4,4',4'',4'''-tetraphenylmethane tetraisocyanate and the like may be used in admixture with diisocyanates so long as the limitations set forth hereinafter with regard to both the soft and hard polymers is met. Also suitable as the organic polyisocyanate are the reaction products containing at least two —NCO groups per molecule of any of the above-mentioned monomeric diisocyanates with any of the previously mentioned active hydrogen containing compounds; higher molecular weight products containing at least two —NCO groups per molecule prepared by the polymerization of polyisocyanate, including dimers and trimers of these compounds, such as, for example, N,N'-bis(4'-methyl-3'-isocyanato phenyl) uretdione; the polymer prepared by polymerizing 3 mols of 2,4-tolylene diisocyanate and the like; polycarbodiimides containing two —NCO groups per molecule prepared from monomeric polyisocyanates and the like. It is preferred, however, that the monomeric diisocyanates be used.

In the preparation of the soft polymer, the isocyanate component should have an average functionality of about 2, that is, either an organic diisocyanate may be used alone or a mixture of organic isocyanates, primarily diisocyanates, with small quantities of isocyanates having a functionality other than 2, such as, monoisocyanates including phenyl isocyanate, hexylisocyanate, cyclohexyl isocyanates or higher functional isocyanates such as those mentioned above may be used. When mixtures are used, the average functionality should be about 2, and should preferably be between about 1.95 and about 2.05.

In the preparation of the hard polymer, organic diisocyanates are preferred, however, mixtures of diisocyanates with isocyanates having higher, lower or both may be used so long as the average functionality of the mixture is from about 1.90 to about 2.20.

In the preparation of the hard polymer any of the organic diisocyanates mentioned above may be used and the diisocyanate may be the same or different from the isocyanate used in the preparation of the soft polymer. Thus, by using different isocyanates in the hard and soft polymers various results can be achieved in the completed article of manufacture which were heretofore impossible where the hard and soft blocks are incorporated into the same molecule.

As hereinbefore indicated, the soft polymers are produced by reacting an organic isocyanate and an active hydrogen containing compound at an NCO to active hydrogen ratio of from about 0.9:1 to about 1.1:1 and the hard polymers are produced at a NCO to active hydrogen ratio of from about 0.9:1 to about 1.2:1. It is to be recognized, however, that the fact that such ratios are slightly above or slightly less than 1:1 does not necessarily mean that the final products are NCO or active hydrogen terminated, since side reactions probably do occur.

It is to be understood that in the preparation of both the hard and soft polymers in accordance with the description set forth above, that various mixtures of various ingredients may be used even though the equivalent weight of a particular ingredient is outside the range of the equivalent weights set forth so long as the average equivalent weight of the active hydrogen mixture is within the range specified. By average equivalent weight is meant the total parts by weight of the active hydrogen materials employed divided by the total equivalents of the active hydrogen materials present. Thus, for example, if a formulation for the preparation of the soft polymer is comprised of 1000 parts (one equivalent) of a polyester diol having a molecular weight of 2000 and 90 parts (two equivalents) of 1,4-butanediol, the total number of parts by weight equals 1090 parts. The total number of equivalents equals three, therefore the average equivalent weight is equal to 1090 divided by 3, or 363, and is clearly within the definition of "soft polymer".

In the method of preparation of either the hard or soft polymer as described above, any suitable method can be used, for example, the different polymers may be prepared in the melt, in solution, in a two phase system, by interfacial polycondensation, such as that described in U.S. Pat. No. 3,236,812 and the like. In the melt method of preparation, the ingredients in the proportions specified above are combined together and as the reaction proceeds and the molecular weight increases the polymer solidifies. The hard and soft polymers can then be blended together by many suitable blending techniques presently known. For example, the individual polymer may be ground and/or extruded to form pellets and the ground material or pellets then mixed in suitable blenders and then again extruded and pelletized, and these pellets containing the two types of polymers in the proportions desired subsequently used by any thermoplastic forming technique such as extrusion, injection molding and the like to form the desired article.

In the solution method of preparation, the individual reactants are mixed together in a solvent for the reactants. Depending upon the ultimate application in which the completed blend is to be used, the solvent is chosen so the hard or soft polymer, whichever is being prepared, will either precipitate from solution or be soluble in the same solvent or solvent system in which the reactants are mixed. Thus if a solid polymer is desired to be used in a manner similar to that prepared in the melt technique a solvent is chosen so it precipitates from the solution and can be recovered by suitable techniques such as centrifuges, decantation and the like. These techniques are applicable regardless of whether a hard or soft polymer is being prepared. If the ultimate application of the blended hard and soft polymers is in a coating application, for example, it is desirable to chose a solvent in which the hard and soft polymers are soluble. Thus, the hard and soft polymers can be prepared individually in solution and then combined in solution and subsequently used in coating applications wherein they are applied to a suitable substrate and the solvent removed by a variety of methods including evaporation, washing out with other materials which are non-solvent for the polymer but a solvent for the initially used solvent and the like. In a variety of this technique, a solvent can be chosen which will dissolve both the initially mixed reactants and the polymer formed and the solidified polymer subsequently recovered by adding to the solution a non-solvent for the polymer but a solvent for the initially used solvent, causing the polymer to precipitate from solution. Recovery of the particular polymer can then be made by the techniques mentioned above. In many instances, the solvent reaction technique for the individual polymer is preferred because of its simplicity of nature, its adaptability to a wide variety of reactants, including those containing amino groups, which are highly reactive with isocyanate groups and because of its adaptability for blending the hard and soft polymers before use in the final desired operating step. The polymers are much more easily blended in solution because only a simple mixing apparatus is necessary. When the solid materials are combined, expensive equipment, for example, blenders and extruders and the like, are required in many instances in order to intimately disperse the hard and soft polymers in each other. Another advantage of the solution technique is that both the hard and the soft polymers can be prepared in higher molecular weight than in the melt technique depending upon the solubility of each polymer in the solvent chosen. This permits a wide latitude in the selection of the hard and soft polymers in order to achieve in the finished article improved properties over a wide temperature range.

The third method mentioned above, interfacial polycondensation, by its very nature exhibits the same advantages as those enjoyed in the solution techniques in that the same type of polymer system can be achieved depending upon the selection of the various ingredients. Further, the polymers may be readily prepared in powder form which lends itself to further applications when combined with the other polymer.

The invention will be further illustrated by the following examples in which parts are by weight unless otherwise specified.

Preparation of Soft Polymers

EXAMPLE S-1

About 100 parts of an hydroxyl polyester having a molecular weight of about 2000, an hydroxyl number of about 56 and an acid number of less than 1, prepared from 10 mols of adipic acid and 11 mols of 1,4-butanediol are mixed with about 9.7 parts of 1,4-butanediol, the mixture being maintained at a temperature of about 60° C. To this mixture is added about 40.6 parts of 4,4'-diphenylmethane diisocyanate also maintained at a temperature of about 60° C. The reactants are intimately and rapidly combined and cast onto a heated plate maintained at a temperature of about 110° to about 115° C. for about 15 minutes to form a slab upon solidification of about ¼" thick. The active hydrogen containing components have an average equivalent weight of about 350 and the NCO to OH ratio of the reaction system is 1.03. The slab of solidified material is subsequently ground to provide particles of a size suitable for introduction to an extruder. The ground particles are injection molded into a test sample exhibiting the properties indicated in Table I.

EXAMPLE S-2

The procedure of Example 1 is repeated with the exception that about 7.5 parts of 1,4-butanediol and about 32.9 parts of 4,4'-diphenylmethane diisocyanate are substituted for the 9.7 parts of 1,4-butanediol and 40.6 parts of 4,4'-diphenylmethane diisocyanate respectively. The average equivalent weight of the active hydrogen component mixture of this example is about 405 and the NCO to OH ratio is 0.985. Data is presented in Table I.

EXAMPLE S-3

The procedure of Example 1 is again followed with the exception that about 22.5 parts of 1,4-butanediol and about 73.8 parts of 4,4'-diphenylmethane diisocyanate are used. The average equivalent weight of the active hydrogen component mixture of this example is about 204 and the NCO to OH ratio is 0.985. (See Table I).

EXAMPLE S-4

The general procedure of Example 1 is again followed with the exception that about 100 parts of a hydroxyl polyester prepared from 15 mols of diethylene glycol and 14 mols of adipic acid and having a molecular weight of about 2100 and a hydroxyl number of about 45, an acid number of less than 1, about 13.9 parts of 1,4-butanediol and about 50 parts of 4,4'-diphenylmethane diisocyanate are used as the reaction mixture. The combined active hydrogen containing components have an average equivalent weight of about 300 and the NCO to OH ratio of the reactive mixture is 1.03. (See Table I).

EXAMPLE S-5

Again the general procedure of Example 1 is followed, however, about 500 parts of a polybutylene ether glycol having a molecular weight of about 1000 prepared from tetrahydrofuran, about 42.5 parts of 1,4-butanediol and about 248 parts of 4,4'-diphenylmethane diisocyanate are used. The average equivalent weight of the active hydrogen containing components is about 279 and the NCO to OH ratio of the reaction mixture is 1.02. (See Table I).

EXAMPLE S-6

The procedure of Example 1 is repeated with the exception that about 16 parts of 1,4-butanediol and about 60 parts of 4,4'-diphenylmethane diisocyanate are substituted for the corresponding quantities used in Example 1. The average equivalent weight of the active hydrogen components is about 254 and the NCO to OH ratio of the reactive mixture is 1.03. (See Table I).

EXAMPLE S-7

The procedure of Example 1 is repeated with the exception that about 23 parts of 1,4-butanediol and about 80 parts of 4,4'-diphenylmethane diisocyanate are substituted for the corresponding quantities used in Example 1. The average equivalent weight of the active hydrogen is about 200 and the NCO to OH ratio of the reactive mixture is 1.03. (See Table I).

EXAMPLE S-8

About 1000 parts of a hydroxyl polyester having a molecular weight of about 2000, a hydroxyl number of about 56 and an acid number of less than 1 prepared from adipic acid and an equal molar ratio of neopentyl glycol and 1,6-hexanediol are mixed with about 85 parts of 1,4-butanediol, about 247 parts of hexamethylene diisocyanate and about 0.05 part of dibutyl tin dilaurate. The reaction mixture is then treated in the same manner as that indicated in Example 1. The active hydrogen containing components have an average equivalent weight of about 380 and the NCO to OH ratio of the reaction system is 1.03. (See Table I).

EXAMPLE S-9

About 100 parts of a polypropylene ether glycol having a molecular weight of about 2000, about 100 parts of a polypropylene glycol having a molecular weight of about 1000 and about 10 parts of a polyether triol having a molecular weight of about 3000 and prepared by propoxylating glycerine are mixed with about 31.5 parts of 1,4-butanediol. To this mixture is added about 132 parts of 4,4'-diphenylmethane diisocyanate. The average equivalent weight of the active hydrogen containing component is about 240 and the NCO to OH ratio is 1.05. (See Table I).

EXAMPLE S-10

The procedure of Example 1 is repeated, however, the components and the quantities of each are altered in the following manner:

About 500 parts of a hydroxyl polyester having a molecular weight of about 2000 and a hydroxyl number of about 56 and an acid number of less than one, prepared from 10 mols of adipic acid, and 11 mols of a mixture of equal molar amounts of ethylene glycol and 1,4-butanediol and about 500 parts of a hexanediol polycarbonate having an hydroxyl number of 56 prepared from hexanediol and diphenylcarbonate as described in U.S. Pat. No. 3,544,524 and about 90 parts of 1,4-butanediol are mixed together and heated to about 60° C. To this active hydrogen containing mixture is added about 382 parts of 4,4'-diphenylmethane diisocyanate which has also been previously heated to about 50° C. The procedural steps of Example 1 are then followed to yield a solid material. The active hydrogen containing components have an average equivalent weight of about 363 and the NCO to OH ratio of the reactants is 1.01. (See Table I).

TABLE I

| | MOLDED BLOCK POLYMERS (including "soft" polymers) | | | | |
|---|---|---|---|---|---|
| | MODULUS, psi | | | SHORE D | STIFFENING |
| Example | 100% | 200% | 300% | HARDNESS | TEMP. ° C |
| S-1 | 650 | 800 | 1250 | 32 | −24 |
| S-2 | 500 | 600 | 1000 | 31 | −31 |
| S-3 | 1850 | — | 3970 | 47 | +10 |
| S-4 | 760 | 960 | 1200 | 35 | −15 |
| S-5 | 810 | 1040 | 1380 | 34 | — |
| S-6 | 1155 | — | 2940 | 46 | −6 |
| S-7 | 1580 | — | 2590 | 50 | +11 |
| S-8 | 720 | 830 | 1010 | 31 | −47 |
| S-9 | 880 | 1200 | 1390 | 29 | −5 |
| S-10 | 690 | 1040 | 1470 | 28 | — |

Preparation of Hard Polymers

EXAMPLE H-1

About 875 parts of 4,4'-diphenylmethane diisocyanate are added to about 700 parts by volume of ethyl acetate at a temperature of about 55° C. in a sigma blade mixer. The temperature drops to about 50° C. upon the addition of the isocyanate and heating is continued. About 300 parts of butanediol are added gradually over a period of approximately ½ hour. This represents an NCO to OH ratio of about 1.05. The temperature is maintained between about 60° and 80° C. After about half of the butanediol is added, the material assumes a dough like appearance and heating is discontinued, and cooling commenced. The reaction mass then begins to ball up and upon completion of the addition of all of the butanediol cooling is discontinued. The reaction mass breaks up into particles within about one-half hour after the complete addition of the butanediol and stirring is continued for about another hour. The mass is then spread out in order to facilitate the evaporation of the solvent and then dried under vacuum.

EXAMPLE H-2

The procedure of Example H-1 is repeated with the exception that 965 parts of 4,4'-diphenylmethane diisocyanate are used. This represents an NCO to OH ratio of 1.16.

EXAMPLE H-3

The procedure of Example H-1 is repeated with the exception that 917 parts of 4,4'-diphenylmethane diisocyanate are used. This represents an NCO to OH ratio of 1.10.

EXAMPLE H-4

A portion of the product prepared in accordance with Example H-2 is washed with methanol to destroy any remaining NCO groups. The material is then dried.

EXAMPLE H-5

The procedure of Example H-1 is repeated with the exception that about 830 parts of a mixture of about 96% 4,4'-diphenylmethane diisocyanate and about 4% of an isomeric mixture of trifunctional isocyanates having the general formula

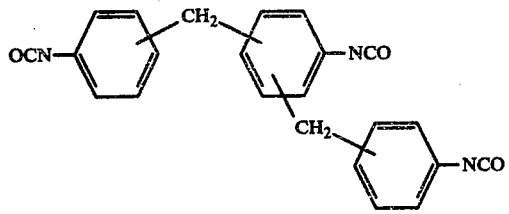

are used. This represents an NCO to OH ratio of 1.00.

EXAMPLE H-6

About 840 parts of 1,6-hexamethylene diisocyanate are dissolved in about 700 parts by volume of ethyl acetate and about 0.15 part of dibutyl tin dilaurate is added. The solution is heated to about 55° C. at which time about 388 parts of 1,4-butanediol are added over a period of about 45 minutes. During the time of the addition of the butanediol the reaction mass is cooled to prevent the temperature from rising above about 85° C. Within about 10 minutes after the completion of the addition of all of the butanediol, the reaction mass breaks up into a fine powder. Stirring is continued for a period of about two hours and the reaction mass is spread out in order to facilitate the evaporation of the solvent and dried in a vacuum of about 90° C. for approximately 16 hours.

EXAMPLE H-7

About 394 parts of 4,4'-diphenylmethane diisocyanate and about 0.3 part of stannous octoate are dissolved in about 500 parts by volume of ethyl acetate. This solution is heated to about 65° C. at which time about 393 parts of dibromoneopentyl glycol are added over a period of about 15 minutes. The reaction mass is cooled in order to maintain the temperature between about 65° and 70° C. After the addition of all of the dibromoneopentyl glycol the reaction mass is taffy like in nature. About 1500 parts by volume of hexane are added and the reaction mass became chunky in nature. The brittle chunks are ground and permitted to dry in a manner similar to that described in Example H-1. The NCO to OH ratio of the reactants used in this example is 1.05.

EXAMPLE H-8

About 696 parts of 2,4-tolylene diisocyanate and about 0.5 part of stannous octoate are dissolved in about 500 parts by volume of ethyl acetate. Heating is applied and about 360 parts of 2,3-butanediol are added over a period of about 1 hour. This represents an NCO to OH ratio of 1.00. The temperature of the reaction mass is maintained below about 80° C. After about 1 hour the addition of the 2,3-butanediol is complete. The reaction mass passes through a taffy like stage and breaks up into a powder about 1 hour after completion of the butanediol. Stirring is continued for an additional hour and the material is dried as in Example H-1.

EXAMPLE H-9

About 705 parts of 2,4-tolylene diisocyanate are added to about 500 parts by volume of ethyl acetate in a sigma blade mixer. Heat is applied and about 275 parts of monoethanolamine are added to the solution over a period of about 1 hour with cooling to maintain the temperature below about 70° C. During the addition of the second half of the monoethanolamine the reaction mass becomes increasingly viscous and finally breaks up into a powder. Agitation is continued for an additional hour. The final reaction mass is vacuum dried for about 24 hours at about 85° to 90° C.

EXAMPLE H-10

The procedure of Example H-1 is followed with the exception that 0.3 part of stannous octoate is added to the solution of 4,4'-diphenylmethane diisocyanate in ethyl acetate. After the reaction product breaks up into particles, it is washed with two successive 1000 part by volume portions of hexame to remove the catalyst. The mass is filtered and treated as in Example H-1.

EXAMPLE H-11

About 788 parts of 4,4'-diphenylmethane diisocyanate are dissolved in about 500 parts by volume of ethyl acetate in a sigma blade mixer and heated to about 60° C. About 186 parts of ethylene glycol are added gradually over a period of about 25 minutes. This represents an NCO to OH ratio of about 1.05. During the next 25 minutes the reaction mass becomes increasingly viscous until it breaks up into a powder. Stirring is continued for about 1 hour. This reaction product is dried overnight under vacuum at about 85° to 90° C.

EXAMPLE H-12

About 591 parts of 4,4'-diphenylmethane diisocyanate and about 0.25 part of stannous octoate are dissolved in about 500 parts by volume of ethyl acetate at a temperature of about 60° C. About 450 parts of a polyethylene glycol having a molecular weight of 200 are added gradually over a period of about 50 minutes, the temperature being maintained less than 70° C. by cooling if necessary. This represents an NCO to OH ratio of about 1.05. Within about 30 minutes after the completion of the addition of the glycol, about 500 parts by volume of hexane are added with cooling. The reaction mass assumes a taffy like appearance and after about 20 minutes the product is washed with hexane to remove the catalyst. The product is transferred to a polyethylene tray where the solvent is permitted to evaporate out. Eventually the material changes into a hard brittle polymer which can be ground.

EXAMPLE H-13

About 550 parts of 4,4'-diphenylmethane diisocyanate are dissolved in about 500 parts by volume of ethyl acetate at a temperature of about 60° C. in a sigma blade mixer. About 203 parts of the polyester of adipic acid ethylene glycol and butylene glycol described in Example S-10 and about 180 parts of 1,4-butanediol in 100 parts by volume of ethyl acetate are added gradually over a period of about 1 hour. The average equivalent weight of the active hydrogen components is 91. This represents an NCO to OH ratio of about 1.05. The reaction mass is maintained at a temperature of about 75 to 85° C. by cooling if necessary. After the addition of the polyol mixture is completed the material balls up and then breaks up into a powder. Agitation is continued for about 1 additional hour. This powder is vacuum dried for about 24 hours at 85° to 90° C.

EXAMPLE H-14

About 656 parts of 4,4'-diphenylmethane diisocyanate are dissolved in about 500 parts by volume of ethyl acetate at a temperature of about 60° C. in a sigma blade mixer. This solution is heated to about 75° C. and about 290 parts of 1,4-cyclohexanediol in flake form are gradually added to the solution over a period of about ½ hour. This represents an NCO to OH ratio of 1.05. The reaction mass becomes increasingly viscous until it breaks up into a fine powder after some of the ethyl acetate has been removed by evaporation. Stirring is continued for about an hour and drying conducted as in Example H-1.

EXAMPLE H-15

About 40 parts of the di-b-hydroxyethyl ether of hydroquinone are dissolved in about 368 parts of dimethyl formamide. To this solution is added about 53 parts of 4,4'-diphenylmethane diisocyanate. A slight exotherm is noted during the addition of the isocyanate and the completed reaction mass is a solution of medium viscosity at about 50° C. and at room temperature is a gel, white in color. The NCO to OH ratio of the reactive mass is 1.05.

EXAMPLE H-16

About 58 parts of 1,4-cyclohexanediol are dissolved in about 757 parts of dimethyl formamide. To this solution is added about 131 parts of 4,4'-diphenylmethane diisocyanate. This represents an NCO to OH ratio 1.05. A slight exotherm is noted upon addition of the isocyanate. At room temperature, the reaction product is a very viscous liquid and at 80 to about 90° C. this same product is quite fluid. This product is in the form of a 20% solution.

EXAMPLE H-17

About 284 parts of 1,4-butanediol are dissolved in about 2400 parts of dimethyl formamide in a reaction flask equipped with a thermometer, dropping funnel, and provisions for both heating and cooling. About 790 parts of 4,4'-diphenylmethane diisocyanate are added via a dropping funnel over a period of about 1 hour. This represents an NCO to OH ratio of 1.00. The reaction flask is cooled to maintain the temperature below about 60° C. After the last of the isocyanate has been added the reaction flask is maintained at about 70° C. for about 1 hour. The resulting product is a clear viscous solution of about 30% solids.

EXAMPLE H-18

About 438 parts of 4,4'-diphenylmethane diisocyanate and about 0.3 part of stannous octoate are dissolved in about 2000 parts by volume of cellosolve acetate in a sigma blade mixer. The temperature of this solution is maintained between about 95° C. and 105° C. and about 299 parts of the dihydroxyethylether of hydroquinone are added over a period of about 20 minutes. Upon completion of the addition of all of the dihydroxyethylether of hydroquinone the reaction mass is a smooth thin slurry. Stirring is continued and the temperature is allowed to drop to about 55° C. At this point the reaction mass is a heavy paste which is filtered and dried. The NCO to OH ratio of the reactants is 1.16.

EXAMPLE H-19

About 99 parts of the diethylether of hydroquinone are added in a container equipped with a high speed agitator and heated to a temperature of about 135° C. About 80 parts of hexamethylene diisocyanate at a temperature of about 50° C. is rapidly added. This represents an NCO to hydroxyl ratio of 0.95. Agitation is conducted for about 1 minute during which time the reaction mass exotherms to a temperature of about 220° C. and is poured onto a tray and allowed to harden. The material is then ground to reduce the particle size.

EXAMPLE H-20

About 192 parts of 1,4-butanediol are dissolved in about 1300 parts of dimethyl formamide in a reactor equipped with a stirrer, a reflex condenser and provision for heating and cooling. The temperature of the reactor is maintained between about 60° C. and about 70° C. and about 508 parts of 4,4'-diphenylmethane diisocyanate are added over a period of about 4 hours. Stirring is continued for an additional two hours while maintaining it at the above temperature to yield a clear, low viscosity solution at room temperature. The NCO to OH ratio of the reactants is 0.95 and results in a 35% solid solution. The solution was heated to about 100° C. and fed through a devolatilizing extruder to remove the solvent. A strand is extruded from this device and subsequently cut into pellets having an average length of ¼ inch.

EXAMPLE H-21

The procedure of Example H-20 is repeated with the exception that about 185 parts of 1,4-butanediol, about 1630 parts of dimethyl formamide and about 515 parts of 4,4'-diphenylmethane diisocyanate are used. This represents an NCO to OH ratio of 1.00 and results in a 30% solid solution. The resulting product is an extremely clear viscous solution at room temperature. The solvent is removed in the same manner described in Example H-20 and the pellets are formed in a like manner.

EXAMPLES H-22, H-23, and H-24

In the practice of the three examples described herein, an apparatus is used for continuously metering and mixing 4,4'-diphenylmethane diisocyanate and 1,4-butanediol and also for removing the reaction product from the vicinity of the mixer. The 4,4'-diphenylmethane diisocyanate is heated and pumped by means of a gear pump to a heated static mix tube comprising a pipe having a series of baffles therein for dispersing and intimately combining reactants. The butanediol at room temperature is pumped by means of a Bosch pump to the static mixer whereupon the reaction components are intimately combined and discharged onto a conveyor moving beneath the static mixer. The temperature of the reaction mixture as it is discharged from the static mixer is about 85° to 95° C. The mixture on the conveyor is permitted to cool to room temperature and solidifies at some temperature between room temperature and the reaction temperature stated above. The slabs are broken up and ground. In these examples, two reactants are metered to the static mixer in accordance with the rates set forth hereinafter.

EXAMPLE

|  | H-22 | H-23 | H-24 |
|---|---|---|---|
| 1,4-butanediol, parts/min. | 68 | 68 | 68 |
| 4,4'-diphenylmethane diisocyanate, parts/min. | 192 | 200 | 220 |
| NCO/OH | 1.01 | 1.05 | 1.16 |

EXAMPLE H-25

The procedure of Examples H-22, H-23 and H-24 are followed with the exception that the 4,4'-diphenylmethane diisocyanate is previously reacted with a sufficient amount of tripropylene glycol to reduce the NCO content from 32% to 24%. The 1,4-butanediol is metered to the static mixer at the rate of about 50 parts per minute and the pre-reacted isocyanate is metered at the rate of about 207 parts per minute. This results in an NCO to OH ratio of 1.05. The product is handled in a manner similar to that described in Examples H-22, H-23, and H-24, and is a hard amber glass in appearance which is ground up for further use.

MIXTURE EXAMPLES

Preparation of mixtures of hard and soft polymers

EXAMPLES M-1 to M-31

The amounts indicated in Table II of hard and soft polymers set forth by example number are dry blended in a tumbler. In each instance the mixture obtained is extruded and pelletized and the pellets injection molded to form suitable test samples, the results of which are also found in Table II.

EXAMPLES M-32 to M-49

Mixtures blended in solution

The polymers of Examples M-32 to M-49 whether hard or soft, if not already present in the form of a solution, are dissolved in dimethyl formamide. The hard and soft polymer solutions are mixed together by any suitable mixing technique and films cast therefrom. These films are tested and the results indicated in Table III.

Figure 2:
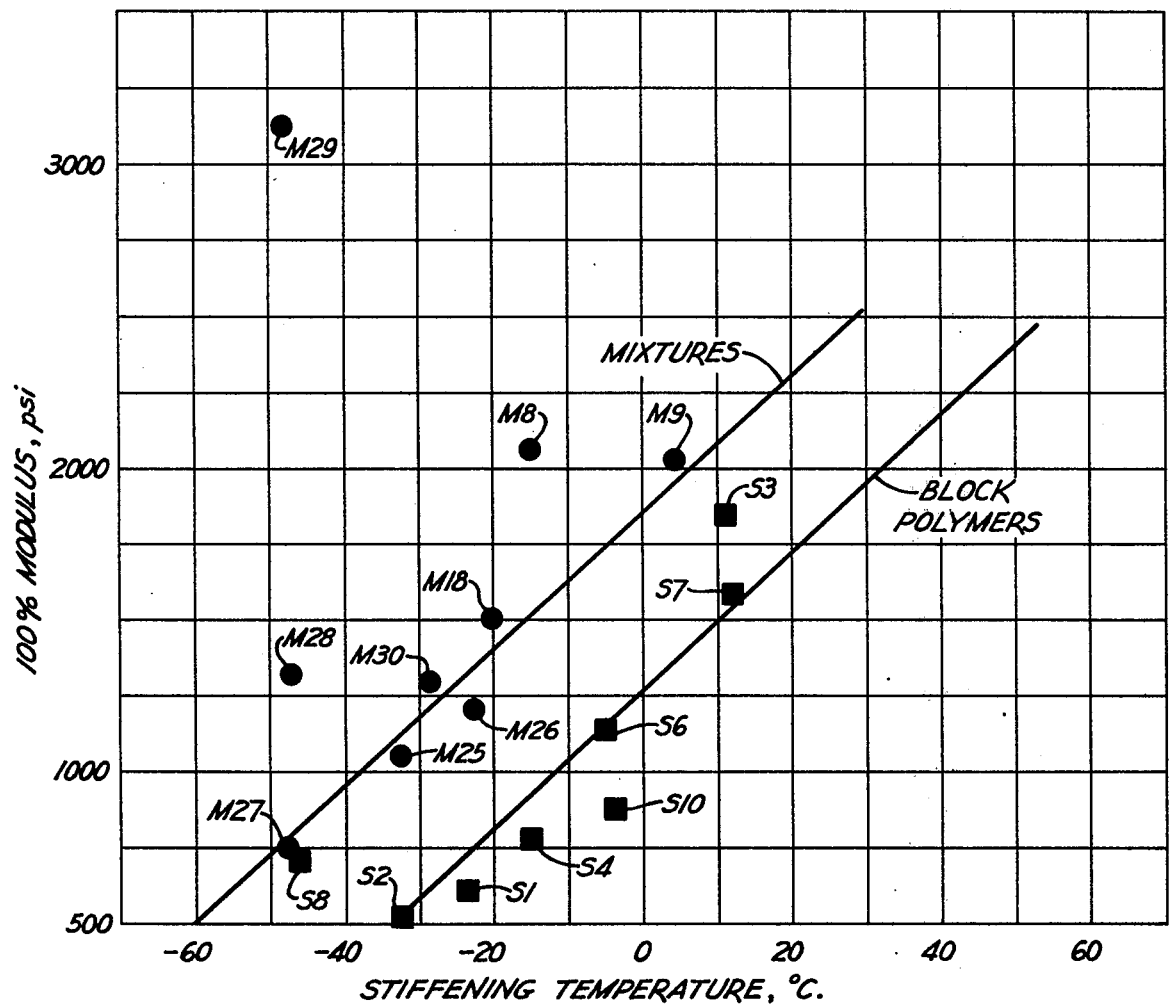

The advantage of using mixtures instead of pure block polymers is revealed in FIG. 2 and has been discussed previously. Note also in Table III, that mixture M-44 has a brittle temperature of −52° C., much lower than the −37° C. of a block polymer of comparable modulus (Example M-46). In fact, even mixture M-45, which has a much higher modulus than M-46 still exhibits a lower brittle temperature of −43° C.

TABLE II

| | | | MOLDED MIXTURES | | | | | |
| | | | Parts of hard Polymer per 100 parts | Modulus, psi | | | Shore D | Stiffening |
| Example | Soft Polymer | Hard Polymer | of Soft Polymer | 100% | 200% | 300% | Hardness | Temp. ° C |
|---|---|---|---|---|---|---|---|---|
| M-1 | S-1 | H-1 | 32 | 1250 | 1750 | 3050 | 45 | — |
| M-2 | " | H-3 | 32 | 1225 | 1750 | 3250 | 47 | — |
| M-3 | " | H-2 | 32 | 1375 | 2050 | 3600 | 46 | — |
| M-4 | " | H-4 | 32 | 1285 | 1700 | 2800 | 46 | — |
| M-5 | " | H-20 | 100 | 3250 | — | — | 68 | — |
| M-6 | " | H-21 | 100 | 5300 | 5300 | 5300 | 73 | — |
| M-7 | " | H-21 | 32 | 1475 | 1800 | 2550 | 50 | — |
| M-8 | S-5 | " | 32 | 2080 | 2540 | 3420 | 48 | −15 |
| M-9 | S-9 | " | 32 | 2030 | 2600 | 3100 | 45 | +5 |
| M-10 | S-1 | H-7 | 0 | 500 | 600 | 900 | 33 | — |
| M-11 | " | " | 8 | 650 | 850 | 1300 | 33 | — |
| M-12 | " | " | 16 | 715 | 970 | 1965 | 33 | — |
| M-13 | S-2 | H-25 | 100 | 3400 | 4000 | 4750 | 66 | — |
| M-14 | " | " | 32 | 1050 | 1350 | 2250 | 43 | — |
| M-15 | " | " | 50 | 1650 | 2300 | 3600 | 49 | — |
| M-16 | " | " | 75 | 12650 | 3300 | 4150 | 55 | — |
| M-17 | " | " | 125 | 6350 | 6350 | — | 77 | — |
| M-18 | S-1 | H-18 | 32 | 1500 | 2050 | 2500 | 45 | −20 |
| M-19 | " | H-15 | 32 | 1415 | 2000 | 3500 | 47 | — |
| M-20 | " | " | 50 | 1865 | 2570 | 4180 | 51 | — |
| M-21 | S-1 | H-5 | 75 | 2650 | 3470 | — | 60 | — |
| M-22 | " | " | 100 | 2950 | 3100 | 3500 | 68 | — |
| M-23 | " | " | 125 | 3750 | 3750 | 3750 | 73 | — |
| M-24 | " | " | 150 | 4700 | — | — | 77 | — |
| M-25 | " | H-6 | 32 | 1050 | 1400 | 2000 | 42 | −32 |
| M-26 | S-2 | " | 32 | 1200 | 1600 | 2450 | 40 | −22 |
| M-27 | S-8 | " | 0 | 720 | 830 | 1010 | 31 | −47 |
| M-28 | " | " | 32 | 1320 | 1620 | 2030 | 39 | −47 |
| M-29 | " | " | 100 | 3110 | 3720 | — | 58 | −48 |
| M-30 | S-1 | H-19 | 32 | 1300 | 1500 | 1900 | 46 | −28 |
| M-31 | " | H-21 | 32 | 600 | 850 | 1300 | 30 | — |

TABLE III

FILMS CAST FROM SOLUTION MIXTURES

| Example | In Solution Soft Polymer | In Solution Hard Polymer | Parts of Hard Polymer per 100 parts of Soft Polymer | Modulus, psi 100% | Modulus, psi 200% | Modulus, psi 300% | Brittle Temperature °C |
|---|---|---|---|---|---|---|---|
| M-32 | S-1 | H-11 | 27 | 1660 | 2640 | 3970 | — |
| M-33 | " | H-12 | " | 1190 | 2370 | 3270 | — |
| M-34 | " | H-8 | " | 1420 | 2590 | 3100 | — |
| M-35 | " | H-10 | " | 1590 | 2380 | 4290 | — |
| M-36 | " | None | 0 | 720 | 1090 | 2220 | — |
| M-37 | S-2 | H-9 | 30 | 950 | 1130 | 1480 | — |
| M-38 | " | H-13 | " | 990 | 1440 | 2470 | — |
| M-39 | " | H-14 | " | 1690 | 2800 | 4820 | — |
| M-40 | " | H-16 | " | 1730 | 3060 | 5670 | — |
| M-41 | " | H-15 | " | 1700 | 2960 | 4700 | — |
| M-42 | " | None | 0 | 580 | 830 | 1480 | — |
| M-43 | " | None | 0 | 600 | 900 | 1800 | −52 |
| M-44 | " | H-17 | 40 | 1650 | 2800 | 4900 | −52 |
| M-45 | " | " | 60 | 2500 | 3900 | 6250 | −43 |
| M-46 | S-3 | None | 0 | 1630 | 2700 | 5130 | −37 |
| M-47 | S-5 | H-10 | 30 | 1820 | 4030 | 5880 | — |
| M-48 | S-9 | "1530 | 2450 | 3670 | — | | — |
| M-49 | S-10 | " | " | 1840 | 3320 | 5800 | — |

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention except as is set forth in the claims.

What is claimed is:

1. A physical thermoplastic mixture of polyurethane polymers which comprises (A) from about 10% to about 90% by weight of a soft thermoplastic polymer prepared by reacting at an NCO to active hydrogen atom ratio of from about 0.9/1 to about 1.1/1 (1) an organic isocyanate having an average functionality of about 2 with (2) an organic compound or compounds containing active hydrogen atoms and having an average functionality of about 2 and an average equivalent weight greater than 200 and (B) from about 90 to about 10% by weight of a hard thermoplastic polymer prepared by reacting at an NCO to active hydrogen ratio of from about 0.9/1 to about 1.2/1 (1) an organic diisocyanate having an average functionality of from about 1.90 to about 2.20 with (2) an organic compound or compounds containing active hydrogen atoms and having an average functionality of about 2 and an average equivalent weight less than 100.

2. The physical mixture of claim 1 wherein the organic isocyanate (A) (1) is a diisocyanate.

3. The physical mixture of claim 1 wherein the organic isocyanate (A) is a mixture of isocyanates having an average functionality of from about 1.95 to about 2.05.

4. The physical mixture of claim 1 wherein the organic isocyanate (B) (1) is a diisocyanate.

5. The physical mixture of claim 1 wherein the organic isocyanate (B) (1) is a mixture of isocyanates having an average functionality of from about 1.90 to about 2.20.

6. The physical mixture of claim 1 wherein the compound (B) (2) is a single difunctional compound having an equivalent weight less than 100.

7. The physical mixture of claim 6 wherein the compound (B) (2) is a glycol.

8. The physical mixture of claim 1 wherein all of the reactants used in the preparation of both the soft polymer and the hard polymer are difunctional.

9. The physical mixture of claim 1 wherein the hard polymer (B) is prepared at an NCO to active hydrogen atom ratio of from 1/1 to 1.2/1.

10. The physical mixture of claim 1 wherein the isocyanates (A) (1) and (B) (1) are both monomeric diisocyanates.

11. The physical mixture of claim 10 wherein the monomeric isocyanates (A) (1) and (B) (1) are 4,4'-diphenylmethane diisocyanate or 1,6-hexane diisocyanate.

12. The physical mixture of claim 10 wherein the isocyanates (A) (1) and (B) (1) are different.

13. The physical mixture of claim 1 wherein the soft polymer A has a Shore D hardness less than 35 and the final mixture has a Shore D hardness greater than 50.

* * * * *